Patented July 7, 1942

2,289,089

UNITED STATES PATENT OFFICE 2,289,089

TREATMENT OF BORNYL CHLORIDE RESIDUES

Troy M. Andrews and Howard F. Reeves, Jr., Weeks, La., assignors to Bay Chemical Company, Inc., New Orleans, La., a corporation of Louisiana No Drawing. Application January 8, 1940,
Serial No. 312,982

8 Claims. (Cl. 260—648)

This invention pertains to recovery of valuable compounds from residues obtained in synthesis of bornyl chloride, and pertains particularly to recovering additional bornyl chloride from such residues.

Bornyl chloride is prepared extensively from purified turpentine oil and itself is sometimes known as "artificial camphor"; more exactly it is an intermediate product in the synthesis of camphor. Bornyl chloride is a derivative of the class of chemical compounds known as terpenes, which are hydrocarbons of the formula $C_{10}H_{16}$. Bornyl chloride is produced from pinene, an unsaturated terpene that is separated from turpentine oil by careful distillation. Bornyl chloride is a saturated terpene.

Bornyl chloride is prepared by saturating cool, dry pinene with dry hydrogen chloride. The hydrogen chloride may combine with the pinene in several ways to produce various products, some solid and some liquid. The chemical reactions are such that hydrogen chloride is added to unsaturated terpenes. The products comprise not only bornyl chloride, sometimes known as pinene hydrochloride, but also various oily products the nature of which is not accurately known. These, however, may contain dipentene dihydrochloride, camphene hydrochloride, fenchyl chloride, and other substances of obscure nature. These are ring compounds that differ among themselves in regard to the nature of the ring, or of a dicyclic bridge contained therein, or of groups added to the ring. From this mixture crystalline bornyl chloride is separated by chilling the mixture to about $-15°$ C. These crystals are removed from the oily material by known methods. This residual oily mixture will be referred to herein as bornyl chloride residue.

It has been found that these residues contain appreciable amounts of bornyl chloride in solution. A purpose of this invention is to remove such residual bornyl chloride with substantial completeness and also to produce a liquid terpene mixture that is valuable. An additional purpose is thus to obtain residual bornyl chloride in relatively pure condition. A further purpose is to accomplish these results in simple and relatively inexpensive manner adaptable to large scale commercial operations.

According to this invention beneficial treatment of bornyl chloride residue comprises selectively dehydrochlorinating the oily terpene compounds and then selectively removing the resulting volatile terpene hydrocarbons from the bornyl chloride that remains. This is accomplished, according to this invention, in the presence of a common solvent for the components of the bornyl chloride residue and for the dehydrochlorinating reagent. Preferably the solvent is sufficiently volatile to maintain moderate temperatures during the selective dehydrochlorinating reactions. Illustrations of preferred practices will clarify the principles upon which are based the appended claims to this invention.

Thus, bornyl chloride residue is heated with alcohol and with alkali metal hydroxide under a reflux condenser. Under these conditions reactions occur selectively to remove the chlorine from the oily constituents of the residue but not from the bornyl chloride. This refluxing is continued from two to eight hours. In this alcoholic solution the alkali metal chloride that is formed precipitates and subsequently may be filtered from the reaction mixture. The filtrate contains alcohol, some water, bornyl chloride in solution, some residual alkali metal hydroxide, and a mixture of terpene hydrocarbons.

This filtrate is subjected to fractional distillation essentially at the boiling point of the alcohol used to remove and recover the alcohol. Thereafter the residual mixture is washed with water. As a result there separates an aqueous layer in which is dissolved the alkali metal hydroxide. This is readily removed.

The liquid mixture now remaining is fractionally distilled to volatilize the terpene hydrocarbons and to leave a residue of crystalline bornyl chloride. Instead of fractional distillation, resort may be had to steam distillation to separate the liquid terpene hydrocarbon mixture from the bornyl chloride, but steam separation is not so efficient as fractional distillation. With fractional distillation the yield of crystalline bornyl chloride varies from 25% to 35% by weight of the bornyl chloride residue.

This invention utilizes the fact that bornyl chloride under moderate heat treatment in alcohol solution of alkali metal hydroxide does not react appreciably, while other constituents of the residue are dehydrochlorinated under these conditions. When dehydrochlorinated, these hydrocarbons are sufficiently stable and are of sufficiently low boiling point to be separated from the bornyl chloride by distillation. Moreover, they are susceptible of separation from each other by fractional distillation.

This mixture of recovered terpene hydrocarbons which may contain small amounts of chlorine is valuable as a solvent for rubber, resins, waxes and other organic substances.

In this treatment, alcohol is illustrative of a common solvent for the chlorinated terpenes and for the reagent hydroxide as well as illustrative of a low boiling agent which serves to regulate temperature during the selective dehydrochlorinating reaction. Suitable alcohols are of saturated aliphatic series containing from one to four carbon atoms. However, it will be apparent to those skilled in the art that other liquids may serve in lieu of alcohol.

The preferred alkali metal hydroxide is sodium hydroxide, for reasons of economy or price, though potassium hydroxide also is useful and in fact is somewhat more soluble. This is a matter of balance between the hydroxide and the alcohol. Preferably, the alcohol used is present in at least one volume for each part by weight of bornyl chloride residue. Smaller amounts of alcohol are operative but require longer periods of heating in order to effect gradual solution of the amount of alkali necessary for reaction.

A specific example will serve further to illustrate preferred practice under this invention. Thus bornyl chloride residue is obtained from saturating cold, dry pinene with dry hydrogen chloride and crystallizing bornyl chloride at a temperature of about −15° C. To the oily residue remaining from this separation ethyl alcohol is added (95%) in proportion of about 430 cc. to 430 grams of the residue. About 120 grams of sodium hydroxide is added to the alcohol solution. This amount of alkali is in excess of the amount consumed in reaction with the combined chlorine. This chlorine seldom exceeds about 21%. The alkaline mixture is heated to boiling for six hours under the reflux condenser. Sodium chloride precipitates and finally is filtered off. From the filtrate, alcohol, is removed by fractional distillation at about 80° C. The remaining mixture then is washed with successive portions of water, for example three 100 cc. portions of water to dissolve and remove excess sodium hydroxide. Removal of this aqueous solution leaves a terpene hydrocarbon liquid mixture. By distilling this mixture at about 180° to 200° C., these hydrocarbons are removed, and leave residual bornyl chloride crystals. These are relatively pure. These crystals amount to substantially 145 grams while the liquid terpene hydrocarbon mixture amounts to about 215 grams.

While in accordance with the patent statutes we have set forth the principles of this invention and have illustrated a preferred practice thereof by specific example, it will now be apparent to those skilled in the art that modifications may be made within the scope of the appended claims.

What we claim is:

1. Process of recovering bornyl chloride, comprising treating bornyl chloride residues containing mixtures of terpene chlorides with alkali metal hydroxide in alcohol solution for selectively dehydrochlorinating other than the bornyl chloride and forming terpene hydrocarbons, and then removing bornyl chloride therefrom.

2. Process of recovering bornyl chloride, comprising treating bornyl chloride residues containing mixtures of terpene chlorides with alkali metal hydroxide in alcohol solution and then heating the mixture at about boiling temperature of the alcohol solution for selectively dehydrochlorinating other than the bornyl chloride and forming terpene hydrocarbons, and then removing bornyl chloride therefrom.

3. Process of recovering bornyl chloride, comprising treating bornyl chloride residues containing mixtures of terpene chlorides with alkali metal hydroxide in about an equal quantity of 95% ethyl alcohol and then heating the mixture at about boiling temperature of the alcohol solution for selectively dehydrochlorinating other than the bornyl chloride and forming terpene hydrocarbons, and then removing bornyl chloride therefrom.

4. Process of recovering bornyl chloride, comprising treating bornyl chloride residues containing mixtures of terpene chlorides with alkali metal hydroxide in alcohol solution and then heating the mixture at about boiling temperature of the alcohol solution for selectively dehydrochlorinating other than the bornyl chloride and forming terpene hydrocarbons, then washing with water to remove alkali metal compounds, and then separating bornyl chloride from the terpene hydrocarbons.

5. Process of recovering bornyl chloride, comprising treating bornyl chloride residues containing mixtures of terpene chlorides with alkali metal hydroxide in alcohol solution and then heating the mixture at about boiling temperature of the alcohol solution for selectively dehydrochlorinating other than the bornyl chloride and forming terpene hydrocarbons, then washing with water to remove alkali metal compounds, and then separating bornyl chloride from the terpene hydrocarbons by distillation.

6. Process of recovering bornyl chloride, comprising treating bornyl chloride residues containing mixtures of terpene chlorides with alkali metal hydroxide in alcohol solution and then heating the mixture at about boiling temperature of the alcohol solution for selectively dehydrochlorinating other than the bornyl chloride and forming terpene hydrocarbons, then washing with water to remove alkali metal compounds, and then separating bornyl chloride from the terpene hydrocarbons by fractional distillation.

7. Process of recovering bornyl chloride, comprising treating bornyl chloride residues containing mixtures of terpene chlorides with alkali metal hydroxide in alcohol solution and then heating the mixture at about boiling temperature of the alcohol solution for selectively dehydrochlorinating other than the bornyl chloride and forming terpene hydrocarbons, then removing alkali metal compounds and then separating terpene hydrocarbons by distillation from remaining bornyl chloride.

8. Process of recovering bornyl chloride, comprising treating bornyl chloride residues containing mixtures of terpene chlorides with alkali metal hydroxide in alcohol solution and then heating the mixture at about boiling temperature of the alcohol solution for selectively dehydrochlorinating other than the bornyl chloride and forming terpene hydrocarbons, then removing alkali metal compounds, then fractionally distilling off remaining alcohol, and then distilling terpene hydrocarbons from remaining bornyl chloride.

TROY M. ANDREWS.
HOWARD F. REEVES, Jr.